US009998933B2

(12) United States Patent
Kono

(10) Patent No.: US 9,998,933 B2
(45) Date of Patent: Jun. 12, 2018

(54) INFORMATION PROCESSING SYSTEM AND INFORMATION PROCESSING METHOD

(71) Applicant: FUJITSU LIMITED, Kawasaki-shi, Kanagawa (JP)

(72) Inventor: Taki Kono, Kodaira (JP)

(73) Assignee: FUJITSU LIMITED, Kawasaki (JP)

( * ) Notice: Subject to any disclaimer, the term of this patent is extended or adjusted under 35 U.S.C. 154(b) by 2 days.

(21) Appl. No.: 15/262,645

(22) Filed: Sep. 12, 2016

(65) Prior Publication Data
US 2016/0381577 A1 Dec. 29, 2016

Related U.S. Application Data

(63) Continuation of application No. PCT/JP2014/059597, filed on Mar. 31, 2014.

(51) Int. Cl.
*H04W 24/04* (2009.01)
*H04W 16/28* (2009.01)
(Continued)

(52) U.S. Cl.
CPC .......... *H04W 24/04* (2013.01); *H04W 4/046* (2013.01); *H04W 8/24* (2013.01); *H04W 16/28* (2013.01)

(58) Field of Classification Search
CPC ....... H04W 24/04; H04W 8/24; H04W 4/046; H04W 16/28
See application file for complete search history.

(56) References Cited

U.S. PATENT DOCUMENTS 5,640,442 A * 6/1997 Fitzgerald ........... H04W 72/085
340/7.21
2003/0117994 A1* 6/2003 Fujii ..................... G04R 20/18
370/349
(Continued)

FOREIGN PATENT DOCUMENTS

JP  5-83180    4/1993
JP  7-203519   8/1995
(Continued)

OTHER PUBLICATIONS

"Master Plan of Shore-Based Facilities for the Global Maritime Distress and Safety System (GMDSS Master Plan)" International Maritime Organization, GMDSS.1/Circ.13, May 23, 2011, (169 pages).

(Continued)

*Primary Examiner* — Daniel Lai
(74) *Attorney, Agent, or Firm* — Staas & Halsey LLP

(57) ABSTRACT

An information processing system includes a mobile terminal, a plurality of base stations, and an information processing device. The information processing device includes: a first processor that executes a first process including: first generating information to be transmitted to the mobile terminal; and first transmitting the generated information to the plurality of base station. The plurality of base stations include a second processor that executes a second process including receiving the information transmitted from the information processing device, then second generating a radio signal in a shortwave frequency band that corresponds to the information, and second transmitting the generated radio signal to the mobile terminal. The mobile terminal includes a third processor that executes a third process including acquiring the information from the radio signal (Continued)

transmitted from one base station among the plurality of base stations in a case where the radio signal is received.

9 Claims, 6 Drawing Sheets

(51) Int. Cl.
  *H04W 4/04* (2009.01)
  *H04W 8/24* (2009.01)

(56) References Cited

U.S. PATENT DOCUMENTS

| | | | |
|---|---|---|---|
| 2008/0070582 A1* | 3/2008 | Cai | H04B 7/15542 455/450 |
| 2009/0028175 A1 | 1/2009 | Tsudaka | |
| 2011/0149938 A1* | 6/2011 | Bajko | H04W 56/00 370/338 |
| 2013/0083679 A1* | 4/2013 | Krishnaswamy | G08G 1/093 370/252 |
| 2014/0219124 A1* | 8/2014 | Chang | H04B 7/0626 370/252 |

FOREIGN PATENT DOCUMENTS

| | | |
|---|---|---|
| JP | 10-332840 | 12/1998 |
| JP | 2000-258174 | 9/2000 |
| JP | 2001-43500 | 2/2001 |
| JP | 2001-283145 | 10/2001 |
| JP | 2002-267769 | 9/2002 |
| JP | 2003-50836 | 2/2003 |
| JP | 2005-189165 | 7/2005 |
| JP | 2006-295397 | 10/2006 |
| JP | 2008-9846 | 1/2008 |
| JP | 2008-11047 | 1/2008 |
| JP | 2010-223639 | 10/2010 |
| JP | 2014-13145 | 1/2014 |

OTHER PUBLICATIONS

Written Opinion of the International Searching Authority dated Jun. 3, 2014 in corresponding International Application No. PCT/JP2014/059597.

International Search Report dated Jun. 3, 2014 in corresponding International Application No. PCT/JP2014/059597.

* cited by examiner

| IDENTIFICATION INFORMATION | BELONGING MANAGEMENT ORGANIZATION | BELONGING FISHING PORT | CONTACT INFORMATION 1 | CONTACT INFORMATION 2 | MANAGEMENT INFORMATION RECEPTION DATE AND TIME | ... |
|---|---|---|---|---|---|---|
| ON2-888801 | OKINAWA PREFECTURAL FISHING INDUSTRY RADIO ASSOCIATION | ITOMAN | 098-xxx-xxxx | ooshiro@abcxxx.ne.jp | MARCH 3, 2014 AT 06:16 | ... |
| ON2-888802 | OKINAWA PREFECTURAL FISHING INDUSTRY RADIO ASSOCIATION | ISHIGAKI | 098-xxx-yyyy | uehara@defxxx.ne.jp | MARCH 4, 2014 AT 18:35 | ... |
| ON2-888803 | OKINAWA PREFECTURAL FISHING INDUSTRY RADIO ASSOCIATION | KADENA | 098-xxx-zzzz | ishikawa@ghixxx.ne.jp | MARCH 5, 2014 AT 00:56 | ... |
| ... | ... | ... | ... | ... | ... | ... |

| EVERY HOUR | BASE STATION 50-1 | | BASE STATION 50-2 | | | | | | |
|---|---|---|---|---|---|---|---|---|---|
| MINUTE(S) | FRE-QUENCY | CONTENT | FRE-QUENCY | CONTENT | FRE-QUENCY | CONTENT | FRE-QUENCY | CONTENT | ... |
| 00 | 2 MHz | PRIORITY COMMUNI-CATION REQUEST | 4 MHz | PRIORITY COMMUNI-CATION REQUEST | 8 MHz | PRIORITY COMMUNI-CATION REQUEST | 12 MHz | PRIORITY COMMUNI-CATION REQUEST | |
| 01 | | | | | | | | | |
| 02 | | | | | | | | | |
| 03 | | INFORMA-TION FOR FIRST AREA | | INFORMA-TION FOR FIRST AREA | | INFORMA-TION FOR FIRST AREA | | INFORMA-TION FOR FIRST AREA | |
| 04 | | | | | | | | | |
| 05 | | | | | | | | | |
| 06 | | | | | | | | | |
| 07 | | INFORMA-TION FOR SECOND AREA | | INFORMA-TION FOR SECOND AREA | | INFORMA-TION FOR SECOND AREA | | INFORMA-TION FOR SECOND AREA | |
| 08 | | | | | | | | | |
| 09 | | | | | | | | | ... |
| 10 | | | | | | | | | |
| 11 | | INFORMA-TION FOR THIRD AREA | | INFORMA-TION FOR THIRD AREA | | INFORMA-TION FOR THIRD AREA | | INFORMA-TION FOR THIRD AREA | |
| 12 | | | | | | | | | |
| 13 | | | | | | | | | |
| 14 | | | | | | | | | |
| 15 | | REGULAR REPORT | | REGULAR REPORT | | REGULAR REPORT | | REGULAR REPORT | |
| 16 | | | | | | | | | |
| 17 | | PRIORITY COMMUNI-CATION RESPONSE | | PRIORITY COMMUNI-CATION RESPONSE | | PRIORITY COMMUNI-CATION RESPONSE | | PRIORITY COMMUNI-CATION RESPONSE | |
| 18 | | | | | | | | | |
| 19 | | | | | | | | | |
| 20 | 4 MHz | PRIORITY COMMUNI-CATION REQUEST | 8 MHz | PRIORITY COMMUNI-CATION REQUEST | 12 MHz | PRIORITY COMMUNI-CATION REQUEST | 16 MHz | PRIORITY COMMUNI-CATION REQUEST | |
| 21 | | | | | | | | | |
| 22 | | | | | | | | | |
| 23 | | INFORMA-TION FOR FIRST AREA | | INFORMA-TION FOR FIRST AREA | | INFORMA-TION FOR FIRST AREA | | INFORMA-TION FOR FIRST AREA | ... |
| 24 | | | | | | | | | |
| 25 | | | | | | | | | |
| 39 | | | | | | | | | |
| 40 | 8 MHz | PRIORITY COMMUNI-CATION REQUEST | 12 MHz | PRIORITY COMMUNI-CATION REQUEST | 16 MHz | PRIORITY COMMUNI-CATION REQUEST | 2 MHz | PRIORITY COMMUNI-CATION REQUEST | |
| 41 | | | | | | | | | |
| 42 | | | | | | | | | |
| 43 | | INFORMA-TION FOR FIRST AREA | | INFORMA-TION FOR FIRST AREA | | INFORMA-TION FOR FIRST AREA | | INFORMA-TION FOR FIRST AREA | ... |
| 44 | | | | | | | | | |
| 45 | | | | | | | | | |
| 59 | | | | | | | | | |

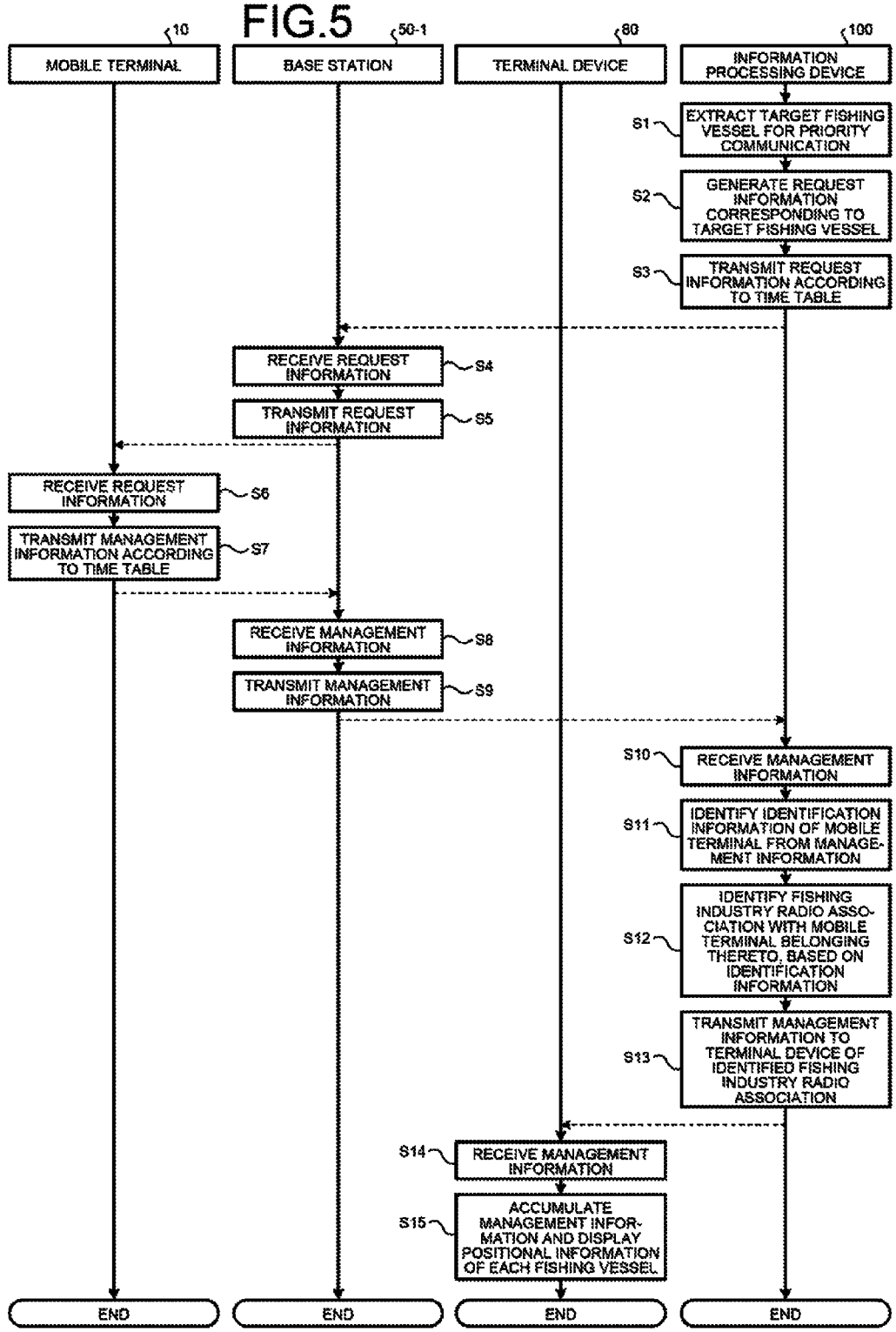

INFORMATION PROCESSING SYSTEM AND INFORMATION PROCESSING METHOD

CROSS-REFERENCE TO RELATED APPLICATION

This application is a continuation application of International Application No. PCT/JP2014/059597, filed on Mar. 31, 2014 and designating the U.S., the entire contents of which are incorporated herein by reference.

FIELD

The embodiments discussed herein are related to an information processing system and an information processing method.

BACKGROUND

Currently, a ship with a gross tonnage greater than or equal to 20 tons is worldwide obligated to install a Global Maritime Distress and Safety System (GMDSS) as a radio communication system therein. However, a GMDSS is expensive, and hence, a fishing vessel with a gross tonnage less than 20 tons is released from installation of the GMDSS by a "deemed GMDSS", where a report of positional information to a fishing industry radio association that controls a fishing vessel is orally executed three times a day by a fishing industry radio.

Patent Document 1: Japanese Laid-open Patent Publication No. 05-083180
Patent Document 2: Japanese Laid-open Patent Publication No. 2006-295397
Patent Document 3: Japanese Laid-open Patent Publication No. 07-203519

However, in the deemed GMDSS, a fishing vessel may be unable to respond in operation or no radio wave from a fishing industry radio may reach a fishing vessel depending on a propagation state of the radio wave. Because a fishing industry radio is provided for audio communication such as a Single Side Band (SSB) using, for example, a shortwave band, its reception state may greatly vary depending on a state of an ionospheric layer so as to cause the communication to be difficult and be unable to be in contact for a long period of time. Accordingly, for a fishing vessel that is unable to be in contact, it is impossible to determine whether no radio wave transmitted from a base station reaches the fishing vessel or an unexpected contingency occurs on the fishing vessel. In a case where communication is executed between land and a ship, as well as the deemed GMDSS, a case of being unable to be in contact for a long period of time may be provided similarly, and it is impossible to determine whether no radio wave transmitted from a base station reaches the ship or an unexpected contingency occurs on the ship.

SUMMARY

According to an aspect of the embodiments, an information processing system includes a mobile terminal, a plurality of base stations, and an information processing device. The information processing device includes: a first processor that executes a first process including: first generating information to be transmitted to the mobile terminal; and first transmitting the generated information to the plurality of base station. The plurality of base stations include a second processor that executes a second process including receiving the information transmitted from the information processing device, then second generating a radio signal in a shortwave frequency band that corresponds to the information, and second transmitting the generated radio signal to the mobile terminal. The mobile terminal includes a third processor that executes a third process including acquiring the information from the radio signal transmitted from one base station among the plurality of base stations in a case where the radio signal is received.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is an illustration diagram illustrating an example of a sentence transmission format;
FIG. 3 is an illustration diagram illustrating an example of a management information storage unit;
FIG. 4 is an illustration diagram illustrating an example of a time table storage unit;
FIG. 5 is a sequence diagram illustrating an example of an operation of an information processing system according to an embodiment.

DESCRIPTION OF EMBODIMENTS

Preferred embodiments will be explained with reference to accompanying drawings. A disclosed technique is not limited to the present embodiments. The following embodiments may appropriately be combined without an inconsistency.

Figure 1:
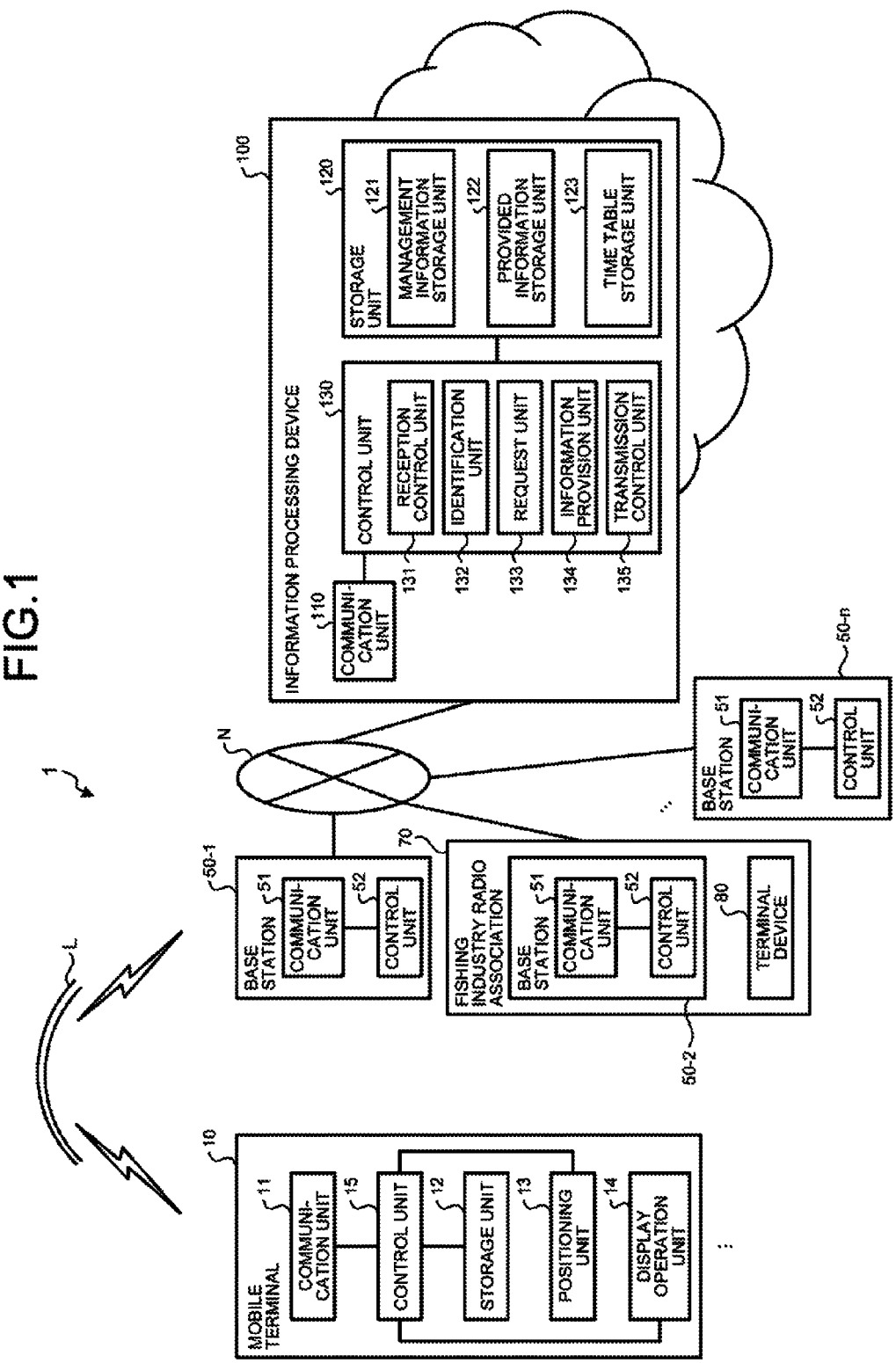
FIG. 1 is a block diagram illustrating an example of a configuration of an information processing system according to an embodiment.

FIG. 1 is a block diagram illustrating an example of a configuration of an information processing system according to an embodiment. An information processing system 1 as illustrated in FIG. 1 includes a mobile terminal 10, a plurality of base stations 50, a terminal device 80, and an information processing device 100. Although FIG. 1 illustrates a case where a system includes a single mobile terminal 10, the number of mobile terminals 10 is not limited and the information processing system 1 may include any number of mobile terminals 10.

The mobile terminal 10 and the plurality of base stations 50 are communicably connected to one another by utilizing reflection of a radio wave in a shortwave band from an ionospheric layer L. The plurality of base stations 50, the terminal device 80, and the information processing device 100 are communicably connected to one another through a network N. For the network N, any kind of wired or wireless communication network, such as the Internet, a Local Area Network (LAN) or a Virtual Private Network (VPN) can be adopted.

An outline of the information processing system 1 will be described herein. In the following description, a fishing vessel will be described as an example of a ship. In the information processing system 1, for example, the mobile terminal 10 is installed in a fishing vessel that operates in a distant sea, for example, a sea area that is 200 nautical miles or greater away from a coast, while the base stations 50 and the terminal device 80 are installed in a fishing industry radio association 70 provided in a neighborhood of a fishing port. In the information processing system 1, the information processing device 100 is provided on, for example, a cloud such as a data center, and is connected to each of the base stations 50 and the terminal device 80 through the network N. In an example of FIG. 1, a base station 50-1 is installed in, for example, Hokkaido and a base station 50-2 is installed in, for example, Okinawa, while another base station 50 is referred to as a base station 50-n. For sake of simplicity, a case where a single fishing industry radio association 70 is provided and the base station 50-2 and the terminal device 80 are installed in the fishing industry radio association 70 is illustrated in FIG. 1, and is not limiting. The base station 50 may solely be installed or may be provided in another fishing industry radio association 70. Similarly, the terminal device 80 may be installed in another fishing industry radio association 70 as a terminal device 80 of the fishing industry radio association 70.

The information processing device 100 extracts a fishing vessel that provides no regular contact for a certain period of time, as a target fishing vessel for priority communication. The information processing device 100 generates request information that corresponds to a target fishing vessel with priority communication being requested. The information processing device 100 transmits request information to the plurality of base stations 50 according to a time table for a fishing industry radio, for example, at a time allotted for a priority communication request. The plurality of base stations 50 transmit request information to a fishing vessel with the mobile terminal 10 installed therein, by a radio for a shortwave band, on one or more conditions among a set of a predetermined time difference and an identical frequency and a set of a different frequency and an identical time, for each base station 50.

The mobile terminal 10 installed in a fishing vessel intercepts one of predetermined frequencies by a radio for a shortwave band at a time allotted for a priority communication request on a time table. The mobile terminal 10 receives request information transmitted from the plurality of base stations 50, and then, transmits management information that includes positional information that indicates a position of its own ship according to a time table to one or more of the plurality of base stations 50 by a radio for a shortwave band. A radio wave transmitted from the mobile terminal 10 reflects from the ionospheric layer L and reaches one or more of the base stations 50 among the base stations 50 that are provided out of a line-of-sight distance.

The base station 50 with the radio wave reaching it receives a radio wave transmitted from the mobile terminal 10 to acquire management information, and then, transmits the acquired management information to the information processing device 100 through the network N. Herein, a radio wave transmitted from the mobile terminal 10 is received by, for example, the base station 50 in a fishing industry radio association 70 that is different from the fishing industry radio association 70 where a fishing vessel with the mobile terminal 10 installed therein belongs thereto.

The information processing device 100 receives management information, and then, identifies identification information of the mobile terminal 10 from the management information, that is, identification information of a fishing vessel with the mobile terminal 10 installed therein. The information processing device 100 refers to a management information storage unit 121 as described later, and transmits management information to the terminal device 80 installed in the fishing industry radio association 70 with the fishing vessel belonging thereto. Thereby, the information processing device 100 can transmit request information through the base stations 50 at a plurality of frequencies and times, and hence, can improve reachability of information for a fishing vessel that is unable to be in contact for a long period of time.

Next, each component that constitutes the information processing system 1 will be described. The mobile terminal 10 includes a communication unit 11, a storage unit 12, a positioning unit 13, a display operation unit 14, and a control unit 15. The mobile terminal 10 may also include a variety of functional units that are included in a known computer, as well as functional units as illustrated in FIG. 1, for example, a variety of functional units such as an input device or an audio output device. For an example of the mobile terminal 10, a tablet terminal, a portable personal computer, or the like can be adopted.

The communication unit 11 is realized by, for example, a radio for a middle-wave to shortwave band or the like. The communication unit 11 is a communication interface that is wirelessly connected to one or more of the plurality of base stations 50 through the ionospheric layer L and executes information communication with the information processing device 100 through the base stations 50 and the network N. The communication unit 11 receives a radio wave transmitted from the base stations 50 and acquires request information or a variety of information. The communication unit 11 transmits management information input from the control unit 15 to the base stations 50.

The communication unit 11 can use, for example, one or more frequency bands among a 2 MHz band, a 4 MHz band, a 8 MHz band, a 12 MHz band, and a 16 MHz band, for a radio wave in a middle-wave to short wave band. For example, the communication unit 11 uses a frequency band selected by an operator for the mobile terminal 10, depending on a distance from land and a time zone. This is because a propagation state of a radio wave in a middle-wave to shortwave band is influenced by an ionospheric layer with a state that is changed depending on solar activity or day or night. For selection of a frequency, a frequency with higher reachability may be selected by calculating a distance to a representative base station 50 based on positional information acquired by positioning in the positioning unit 13 and weighting each frequency depending on the calculated distance, a season, and a time. For selection of a frequency, such selection is executed by taking a band characteristic of each frequency band into consideration.

The communication unit 11 can use, for example, a digital modulation such as Phase Shift Keying (PSK) or Frequency Shift Keying (FSK) for a modulation method. The communication unit 11 can use, for example, a modulation method such as PSK31 in a low-frequency band. For example, PSK31 provides a low communication speed of 31 baud, but has a narrow occupied band width that is suitable for data communication in a shortwave band for mainly communicating text data. For a method of connection between the communication unit 11 and the control unit 15, a modulation signal can be input or output by, for example, using serial communication that uses RS-232C for control of the communication unit 11 and using a voice input/output terminal for transfer of data such as management information.

The storage unit 12 is realized by, for example, a semiconductor memory element such as a Random Access Memory (RAM) or a Flash Memory or a storage device such as a hard disk or an optical disc. The storage unit 12 stores a variety of information that is included in management information, a blank map that is a chart for an operational sea area, received weather information, graphic information that is arranged on the blank map based on the weather information, received market information, a time table that is used for communication with the base stations 50, information that is used for processing in the control unit 15, and the like.

The positioning unit 13 receives a signal from a satellite positioning system. The positioning unit 13 receives a signal from a global navigation satellite system such as the Global Positioning System (GPS), the Global Navigation Satellite System (GLONASS), the Galileo, or the Compass, as a satellite positioning system, to execute positioning. As positioning is requested from the control unit 15, the positioning unit 13 executes the positioning and outputs a result of the positioning as positional information based on a geodetic system such as the World Geodetic System (WGS) 84. As continuous positioning is requested from the control unit 15, the positioning unit 13 executes the positioning continuously and continues to output positional information until a stop thereof is requested from the control unit 15. The positioning unit 13 may receive a signal from a regional navigation satellite system such as the Quasi-Zenith Satellite System, the Indian Regional Navigation Satellite System, the Doppler Orbitography and Radio-positioning Integrated by Satellite (DORIS), or the BeiDou, as a satellite positioning system.

The display operation unit 14 is a display device for displaying a variety of information and an input device that receives a variety of operations from a user. For example, the display operation unit 14 is realized by a liquid crystal display or the like as a display device. For example, the display operation unit 14 is realized by a touch panel or the like as an input device. That is, the display operation unit 14 is such that a display device and an input device are integrated therein. For example, the display operation unit 14 displays a keyboard on a lower portion of a screen thereof and receives a key input, as a user interface. The display operation unit 14 outputs an operation input by a user, as operation information, to the control unit 15. The display operation unit 14 displays a blank map with a variety of information input from the control unit 15 being plotted thereon, positional information, weather information, market information, or the like.

The control unit 15 is realized by, for example, a program that is stored in an internal storage device and executed by a Central Processing Unit (CPU), a Micro Processing Unit (MPU), or the like while a work area is provided in the RAM. The control unit 15 may be realized by, for example, an integrated circuit such as an Application Specific Integrated Circuit (ASIC) or a Field Programmable Gate Array (FPGA). The control unit 15 controls a whole of the mobile terminal 10. For example, for the deemed GMDSS, the control unit 15 acquires positional information from the positioning unit 13 and transmits management information that includes the acquired positional information to the base stations 50 through the communication unit 11, three or more times a day.

For example, the control unit 15 receives, through the communication unit 11, one of predetermined frequencies at a time allotted for a priority communication request on a time table. The control unit 15 receives request information transmitted from the plurality of base stations 50, and then, determines whether or not identification information included in the request information is identification information of its own mobile terminal 10. In a case where identification information included in request information is identification information of its own mobile terminal 10, the control unit 15 transmits management information that includes positional information that indicates a position of its own ship to one or more of the plurality of base stations 50 through the communication unit 11. That is, the control unit 15 transmits a transmission time zone and a transmission frequency that are included in request information and management information that includes positional information that indicates a position of its own ship according to a time table, to one or more of the plurality of base stations 50 through the communication unit 11. In a case where identification information included in request information is not identification information of its own mobile terminal 10, the control unit 15 ignores the request information.

The control unit 15 requests the positioning unit 13 to execute positioning at a time of regular communication for the deemed GMDSS or in a case where request information is received, in order to acquire positional information that is included in management information. The control unit 15 outputs either a request of one-time positioning or a request of continuous positioning, as a request of positioning, to the positioning unit 13. As positional information corresponding to a request of positioning is input from the positioning unit 13, the control unit 15 inserts the positional information into a sentence transmission format to produce a sentence for transmission that is management information. The control unit 15 outputs the produced sentence for transmission, that is, management information, to the communication unit 11. The control unit 15 may encrypt a portion of positional information in such a manner that decryption thereof can be executed by only the terminal device 80 in the fishing industry radio association 70 where a fishing vessel with the mobile terminal 10 installed therein belongs thereto.

Figure 2:
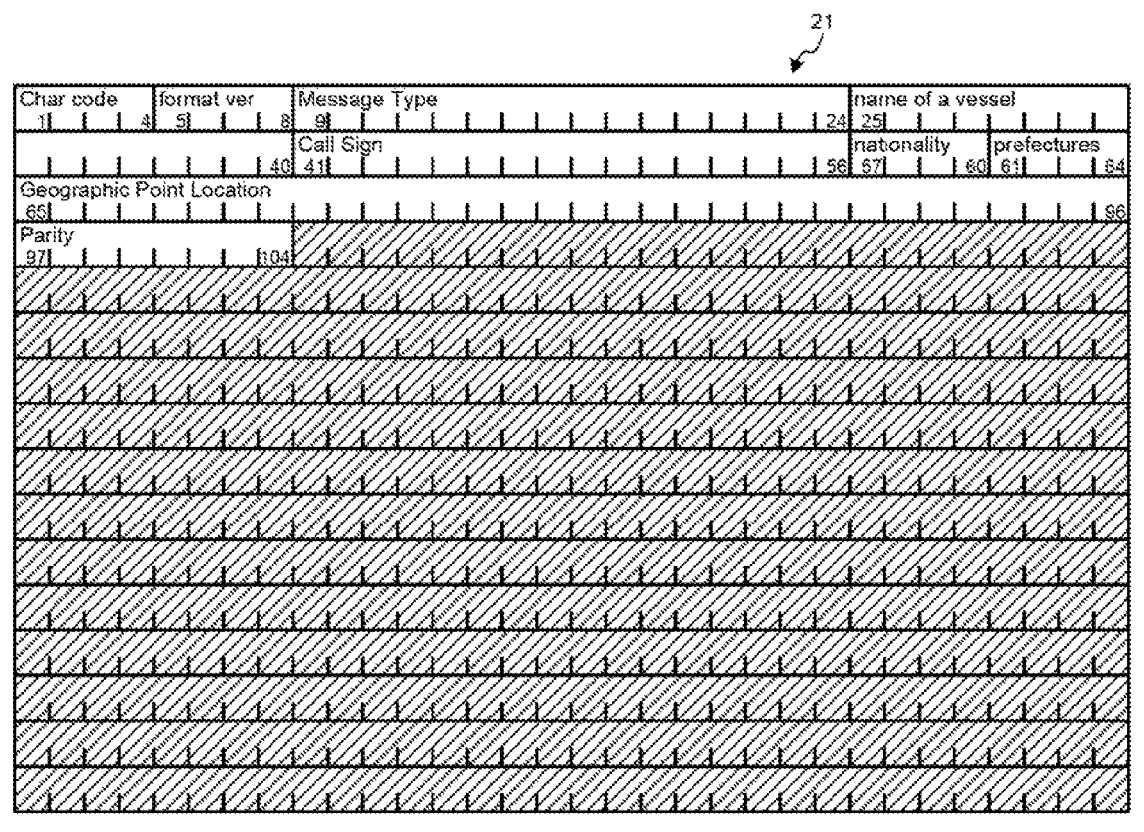

FIG. 2 is an illustration diagram illustrating an example of a sentence transmission format. As illustrated in FIG. 2, for example, a sentence transmission format 21 includes items of "Char code", "format ver", "Message Type", "name of a vessel", "Call Sign", "nationality", "prefectures", "Geographic Point Location", and "Parity". In the sentence transmission format 21 in FIG. 2, for example, one cell is one byte. A length of the sentence transmission format 21 as illustrated in FIG. 2 is 104 bytes as an example, is not limited thereto, and can be any length. For an additional item of the sentence transmission format 21, a code of another radio association for readdressing, a positional information mask level that indicates a level of masking, that is, encrypting, of a portion of positional information, or the like, may be provided.

"Char code" indicates a character code system. "format ver" indicates a version of the sentence transmission format 21, and is an item for dealing with a format change. "Message Type" indicates a message type, and represents, for example, a kind of message, such as automatic one, manual one, requested transmission, or emergency. "name of a vessel" represents a vessel name or identification information of a fishing vessel with the mobile terminal 10 installed therein. "name of a vessel" may represent a vessel name and identification information of a fishing vessel if the number of characters is sufficient. "Call Sign" represents a call sign of a radio station for reliable identification thereof. "nationality" is an abbreviation for "nationality registration" and indicates a code of a country with a vessel registered therein. "prefectures" represents a belonging prefecture. "Geographic Point Location" indicates positional information, and represents, for example, a positioning system, latitude, and longitude. "Parity" is parity for confirming complete reception of a message.

For example, the control unit 15 receives information that includes information to identify a blank map and weather information that corresponds to a position on a blank map, from the base stations 50, and then, refers to the storage unit 12 to identify a blank map corresponding to weather information. The control unit 15 arranges, and causes the display operation unit 14 to display, graphic information based on weather information on the blank map. The control unit 15 additionally causes the display operation unit 14 to display a variety of information such as market information of a marine product for each port with a signal received therein or a port with landing scheduled based on the market information.

By referring back to a description for FIG. 1 the base station 50 includes a communication unit 51 and a control unit 52. For example, the base station 50 includes a radio for each frequency band and each radio is connected to a non-illustrated antenna so as to be able to simultaneously communicate with the mobile terminals 10 installed in a plurality of fishing vessels in respective frequency bands.

The communication unit 51 is realized by, for example, a radio in a middle-wave to shortwave band or the like. The communication unit 51 is realized by, for example, a Network Interface Card (NIC) or the like, in order to execute communication with the information processing device 100 through the network N. The communication unit 51 is wirelessly connected to one or more of a plurality of the mobile terminals 10 through the ionospheric layer L, and connected to the information processing device 100 through the network N. That is, the communication unit 51 is a communication interface that executes information communication between the mobile terminal 10 and the base station 50 and between the base station 50 and the information processing device 100. That is, the base station 50 relays communication between the mobile terminal 10 and the information processing device 100. The communication unit 51 executes wired or wireless connection to the network N.

The communication unit 51 receives a radio wave transmitted from the mobile terminals 10 by a plurality of radios, for example, five radios that correspond to a 2 MHz band, a 4 MHz band, a 8 MHz band, a 12 MHz band, and a 16 MHz band, as, for example, radios in a middle-wave to shortwave band. The communication unit 51 receives radio signals that are transmitted from a plurality of the mobile terminals 10 and use radio waves with respectively different frequencies, by a plurality of radios with frequencies corresponding thereto. A frequency band to be used is determined depending on one or more of a position of a fishing vessel with the mobile terminal 10 installed therein and a time zone. For a modulation method, the communication unit 51 uses a modulation method similar to that of the communication unit 11 of the mobile terminal 10. For connection to the control unit 52, the communication unit 51 can also use serial communication that uses RS-232C and data communication that uses a voice input/output terminal, similarly to the mobile terminal 10.

The communication unit 51 extracts, and outputs to the control unit 52, management information from the received radio wave. The communication unit 51 transmits the extracted management information to the information processing device 100 through the network N by an NIC. The communication unit 51 transmits request information transmitted from the information processing device 100 through the network N to a fishing vessel with the mobile terminal 10 installed therein, on one or more conditions among a set of a predetermined time difference and an identical frequency and a set of a different frequency and an identical time, according to a time table. Similarly, the communication unit 51 also transmits other information to a fishing vessel with the mobile terminal 10 installed therein, according to a time table.

The control unit 52 controls a whole of the base station 50. As management information is input from the communication unit 51, the control unit 52 causes a non-illustrated display unit to display, for example, the management information having been received. The control unit 52 is, for example, a computer for control of the base station 50 that may be, for example, an embedded computer, a stationary personal computer, or the like.

The control unit 52 refers to a time table stored in a non-illustrated storage unit and controls the communication unit 51 in such a manner that a variety of information received from the information processing device 100 is transmitted to the mobile terminal 10.

The terminal device 80 is, for example, a computer that is installed in the fishing industry radio association 70 and receives, from the information processing device 100, provision of management information transmitted from the mobile terminal 10 of a fishing vessel that belongs to the fishing industry radio association 70. For an example of the terminal device 80, a personal computer can be adopted. For the terminal device 80, a variety of portable terminal devices as well as a stationary terminal such as the personal computer as described above can also be adopted as the terminal device 80. The terminal device 80 accumulates and stores management information received from the information processing device 100 through the network N in a non-illustrated storage unit. The terminal device 80 manages, for example, a fishing vessel that belongs to the fishing industry radio association 70. The terminal device 80 manages, for example, identification information, a captain, date and time of sailing out, a fishing sea area, scheduled date and time of returning, or the like of a fishing vessel, as manage information of the fishing vessel. The terminal device 80 may transmit port information or the like to the mobile terminal 10 of a fishing vessel that belongs to the fishing industry radio association 70, through the information processing device 100.

The information processing device 100 includes a communication unit 110, a storage unit 120, and a control unit 130. The information processing device 100 may include a variety of functional units that are included in a known computer, for example, a variety of functional units such as an input device or an audio output device, other than functional units as illustrated in FIG. 1. The information processing device 100 may be configured to be provided on a so-called cloud and to be capable of extending or changing such a configuration freely.

The communication unit 110 is realized by, for example, an NIC or the like. The communication unit 110 is a communication interface that provides wired or wireless connection to the base stations 50 through the network N and executes information communication with the base stations 50. The communication unit 110 receives management information from the base stations 50. The communication unit 110 outputs the received management information to the control unit 130. Management information with identification information of the mobile terminal 10 being identified is input from the control unit 130 to the communication unit 110. The communication unit 110 transmits the input identified management information to a management organization corresponding to the management information, that is, the terminal device 80 of the fishing industry radio association 70 where a fishing vessel with the mobile terminal 10 that has transmitted the management information being installed therein belongs thereto.

As request information is input from the control unit 130, the communication unit 110 transmits the request information to the base stations 50 through the network N. As information that is input from the control unit 130 and includes weather information or the like is input therefrom, the communication unit 110 transmits the information to the base stations 50 through the network N.

The storage unit 120 is realized by, for example, a semiconductor memory element such as a RAM or a flash memory or a storage device such as a hard disk or an optical disc. The storage unit 120 includes a management information storage unit 121, a provided information storage unit 122, and a time table storage unit 123. The storage unit 120 stores information that is used for processing in the control unit 130.

The management information storage unit 121 stores identification information of a fishing vessel, a belonging management organization, a belonging fishing port, and contact information associatively with one another. FIG. 3 is an illustration diagram illustrating an example of a management information storage unit. As illustrated in FIG. 3, the management information storage unit 121 includes items of "IDENTIFICATION INFORMATION", "BELONGING MANAGEMENT ORGANIZATION", "BELONGING FISHING PORT", "CONTACT INFORMATION 1", "CONTACT INFORMATION 2", and "MANAGEMENT INFORMATION RECEPTION DATE AND TIME".

For example, "IDENTIFICATION INFORMATION" is a fishing vessel registration number and identifies a fishing vessel. "BELONGING MANAGEMENT ORGANIZATION" indicates a management organization with a fishing vessel belonging thereto, for example, a fishing industry radio association or the like. "BELONGING FISHING PORT" indicates a fishing port with a fishing vessel belonging thereto. A fishing port with a fishing vessel belonging thereto corresponds to, for example, a fishery cooperative association with the fishing vessel belonging thereto. "CONTACT INFORMATION 1" or "CONTACT INFORMATION 2" indicates, for example, a contact telephone number, a contact mail address, or the like, for a family of a captain of a fishing vessel. "MANAGEMENT INFORMATION RECEPTION DATE AND TIME" indicate date and time when management information is received from the mobile terminal 10 of a fishing vessel that is identified by identification information. As new management information is received, "MANAGEMENT INFORMATION RECEPTION DATE AND TIME" is updated so as to be date and time of such reception. That is, "MANAGEMENT INFORMATION RECEPTION DATE AND TIME" indicate date and time when last management information is received from the mobile terminal 10 of the fishing vessel.

The provided information storage unit 122 stores port information received from the terminal device 80 in the fishing industry radio association 70 or the like. The provided information storage unit 122 stores information to identify a blank map that is a chart for an operational sea area, weather information acquired from a non-illustrated external server through the network N, market information acquired from a terminal device in a non-illustrated fishery cooperative association or the like through the network N, and the like. The provided information storage unit 122 may additionally store a variety of information that is provided to the mobile terminal 10.

The time table storage unit 123 stores, for example, a time table that determines what information content is transmitted by what frequency band at what minutes every hour, for information that is transmitted from each base station 50. FIG. 4 is an illustration diagram illustrating an example of a time table storage unit. As illustrated in FIG. 4, the time table storage unit 123 includes items of "* MINUTE(S) EVERY HOUR", "BASE STATION 50-1", "BASE STATION 50-2", "FREQUENCY", and "CONTENT".

"* MINUTE(S) EVERY HOUR" indicate(s) a time in an hour on a minute-by-minute basis. Each of "BASE STATION 50-1" and "BASE STATION 50-2" indicates the base station 50 corresponding thereto. "FREQUENCY" indicates a frequency for transmission from the base station at a time. "CONTENT" indicates a content of communication at the time. For example, from 0 minutes to 2 minutes and 59 seconds every hour on a time table, the base station 50-1 transmits a priority communication request at frequencies of 2 MHz and 4 MHz. The base station 50-2 transmits a priority communication request at frequencies of 8 MHz and 12 MHz. From 3 minutes to 6 minutes and 59 seconds every hour on a time table, the base station 50-1 transmits information for a first area at frequencies of 2 MHz and 4 MHz. The base station 50-2 transmits information for a first area at frequencies of 8 MHz and 12 MHz.

For example, from 17 minutes to 19 minutes and 59 seconds every hour on a time table, the base station 50-1 receives a priority communication response at frequencies of 2 MHz and 4 MHz. The base station 50-2 receives a priority communication response at frequencies of 8 MHz and 12 MHz. In an example of FIG. 4, a time table causes each base station 50 to change a part of frequencies and transmit information with an identical content to the mobile terminal 10 every 20 minutes or receive management information from the mobile terminal 10 that corresponds to a priority communication request. For example, the base station 50-1 transmits and receives an identical content at a frequency of 4 MHz from 0 minutes to 19 minutes and 59 seconds every hour and from 20 minutes to 39 minutes and 59 seconds every hour.

By referring back to a description for FIG. 1 the control unit 130 is realized by, for example, a program that is stored in an internal storage device and executed by a CPU, a MPU, or the like while a work area is provided in a RAM. The control unit 130 may be realized by, for example, an integrated circuit such as an ASIC or a FPGA. The control unit 130 includes a reception control unit 131, an identification unit 132, a request unit 133, an information provision unit 134, and a transmission control unit 135, and realizes or executes an information-processing function or action as described below. An internal configuration of the control unit 130 is not limited to the configuration as illustrated in FIG. 1 and may be another configuration as long as such a configuration executes information processing as described later.

The reception control unit 131 receives management information from the plurality of base stations 50 through the communication unit 110 and the network N. The reception control unit 131 receives, as management information, for example, management information transmitted from a mobile terminal 10 at an interval of a predetermined period of time or greater. Herein, a predetermined period of time can be, for example, 3 hours. For example, in a case where the mobile terminal 10 transmits management information at an interval of 6 hours, the reception control unit 131 does not strictly provide the interval of 6 hours but permits a slight amount of tolerance of a period of time. The reception control unit 131 may receive, or may receive none of or neglect, management information transmitted from the mobile terminal 10 at an interval less than a predetermined period of time. The reception control unit 131 receives, from the plurality of base stations 50, management information transmitted from an identical mobile terminal 10, depending on a propagation state of a radio wave. The reception control unit 131 outputs the received management information to the identification unit 132.

As the management information is input from the reception control unit 131, the identification unit 132 identifies identification information of the mobile terminal 10 from the received management information based on the sentence transmission format 21. For identification information, a fishing vessel registration number for identifying a fishing vessel may be used or a call sign that is allotted for a radio station for the mobile terminal 10 may be used. The identification unit 132 transmits the received management information and the identified identification information to the transmission control unit 135 associatively with one another.

The request unit 133 refers to the management information storage unit 121 and extracts identification information with management information reception date and time that are provided in a predetermined period of time or greater before current date and time. The request unit 133 extracts a fishing vessel with the mobile terminal 10 that corresponds to the extracted identification information being installed therein, as a target fishing vessel for priority communication. That is, the request unit 133 extracts a fishing vessel that is unable to be in contact for a long period of time. The request unit 133 generates request information that includes identification information of the mobile terminal 10 installed in a target fishing vessel and a transmission time zone and a transmission frequency to transmit management information and is to request the mobile terminal 10 being a target to transmit the management information. The request unit 133 outputs the generated request information to the transmission control unit 135.

The information provision unit 134 refers to the provided information storage unit 122 and generates information that includes information to identify a blank map and weather information that corresponds to a position on the blank map. The information provision unit 134 refers to the provided information storage unit 122 and generates market information of a marine product for each port or the like. The information provision unit 134 outputs each piece of the generated information to the transmission control unit 135. That is, the request unit 133 and the information provision unit 134 are a generation unit that generates information to be transmitted to the mobile terminal 10.

As management information and identification information associated therewith are input from the identification unit 132, the transmission control unit 135 refers to the management information storage unit 121 and identifies a management organization with the mobile terminal 10 belonging thereto, based on the identification information. That is, the transmission control unit 135 identifies the fishing industry radio association 70 where a fishing vessel with the mobile terminal 10 installed therein belongs thereto, based on identification information. The transmission control unit 135 transmits management information to the terminal device 80 in the identified fishing industry radio association 70 through the communication unit 110 and the network N.

In a case where identification information of management information input from the identification unit 132 is identical to identification information of management information having already been transmitted to the terminal device 80 in the fishing industry radio association 70 within a predetermined period of time, the transmission control unit 135 discards the input management information and identification information. That is, the transmission control unit 135 executes no transmission to the terminal device 80 in the fishing industry radio association 70 while the input management information and identification information are a second or subsequent piece of management information received by the plurality of base stations 50.

In a case where a portion of positional information that is included in management information is encrypted, the transmission control unit 135 transmits the management information to the terminal device 80 in the identified fishing industry radio association 70 thorough the communication unit 110 and the network N in such a manner that the positional information is not decoded and the portion remains encrypted.

The transmission control unit 135 transmits reception information to indicate that management information transmitted from the mobile terminal 10 is received, to a non-illustrated terminal device of a person involved in a fishing vessel with the mobile terminal 10 installed therein, through the communication unit 110 and the network N. For example, the transmission control unit 135 refers to the management information storage unit 121, acquires a mail address of the person involved, and transmits reception information in an electronic mail. Reception information may merely be such that management information has been received, or for example, other information such as positional information may be added thereto.

In a case where information to identify emergency information is included in management information, the transmission control unit 135 immediately transmits the management information to a non-illustrated organization that corresponds to the emergency information, for example, the Japan Coast Guard or the like. Thereby, the information processing device 100 can immediately transmit emergent information to an organization capable of dealing therewith.

As request information is input from the request unit 133, the transmission control unit 135 refers to the time table storage unit 123, and transmits the request information to the plurality of base stations 50 through the network N so as to execute its transmission to the mobile terminal 10 in a corresponding transmission time zone and at a corresponding transmission frequency. As each piece of information is input from the information provision unit 134, the transmission control unit 135 refers to the time table storage unit 123, and transmits each piece of the information to the plurality of base stations 50 through the network N so as to execute its transmission to the mobile terminal 10 in a corresponding transmission time zone and at a corresponding transmission frequency.

Next, an operation of the information processing system 1 according to the embodiment will be described. In the following description, a case where no contact for the deemed GMDSS is provided from a fishing vessel that has gone fishing in a distant sea, for a long period of time, and management information of the fishing vessel is transmitted by priority communication will be described as an example of an operation of the information processing system 1. In the flowing description, a case will be described where the mobile terminal 10 belongs to the fishing industry radio association 70 that includes the base station 50-2 and the mobile terminal 10 receives a radio wave transmitted from the base station 50-1. A case will be described where a radio wave transmitted from the mobile terminal 10 is not able to be received by the base station 50-2 but is able to be received by the other base station 50-1. That is, in the following description, a case will be described where communication in a shortwave band is possible between the mobile terminal 10 and the base station 50-1.

FIG. 5 is a sequence diagram illustrating an example of an operation of an information processing system according to the embodiment. The request unit 133 in the information processing device 100 refers to the management information storage unit 121 and extracts identification information with management information reception date and time that are provided in a predetermined period of time or greater before current date and time. The request unit 133 extracts a fishing vessel with the mobile terminal 10 that corresponds to the extracted identification information being installed therein, as a target fishing vessel for priority communication (step S1).

The request unit 133 generates request information that includes identification information of the mobile terminal 10 installed in a target fishing vessel and a transmission time zone and a transmission frequency to transmit management information and is to request a target mobile terminal 10 to transmit the management information (step S2). The request unit 133 outputs the generated request information to the transmission control unit 135.

As request information is input from the request unit 133, the transmission control unit 135 refers to the time table storage unit 123 and transmits the request information to the plurality of base stations 50 through the network N so as to execute its transmission to the mobile terminal 10 in a corresponding transmission time zone and at a corresponding transmission frequency. That is, the transmission control unit 135 transmits request information to the plurality of base stations 50 through the network N according to a time table (step S3).

The communication unit 51 in the base station 50-1 receives request information from the information processing device 100 through the network N (step S4). The communication unit 51 transmits request information to a fishing vessel with the mobile terminal 10 installed therein, according to a time table (step S5). That is, the communication unit 51 transmits request information to a fishing vessel with the mobile terminal 10 installed therein, at a time allotted for a priority communication request on a time table. Herein, a time table identical to that of the information processing device 100 is preliminarily stored in a non-illustrated storage unit in each base station 50 and the communication unit 51 refers to the time table so that a transmission time zone and a transmission frequency in request information can be determined. The base station 50 may receive a transmission time zone and a transmission frequency in request information together with the request information from the information processing device 100 and transmit the request information to the mobile terminal 10 depending on the received transmission time zone and transmission frequency.

The control unit 15 in the mobile terminal 10 installed in a fishing vessel receives a radio wave with one of predetermined frequencies through the communication unit 11 at a time allotted for a priority communication request on a time table. Herein, for a time table of the mobile terminal 10, a time table identical to that of the information processing device 100 is preliminarily stored in the storage unit 12 before sailing out. The control unit 15 refers to the time table, determines a reception time zone and a reception frequency, and receives request information (step S6).

The control unit 15 receives request information transmitted from the plurality of base stations 50, and then, determines whether or not identification information included in the request information is identification information of its own mobile terminal 10. In a case where identification information included in request information is identification information of its own mobile terminal 10, the control unit 15 generates management information. First, the control unit 15 requests the positioning unit 13 to execute positioning. As positional information corresponding to a request of positioning is input from the positioning unit 13, the control unit 15 insets the positional information into a sentence transmission format to generate management information.

The control unit 15 extracts a transmission time zone and a transmission frequency that are included in the request information. The control unit 15 transmits management information that includes the extracted transmission time zone and transmission frequency and positional information to indicate a position of its own ship according to a time table to one or more of the plurality of base stations 50 through the communication unit 11 (step S7).

The communication unit 51 in the base station 50-1 receives a radio wave transmitted from the mobile terminal 10. That is, the communication unit 51 receives management information that is included in the received radio wave (step S8). The communication unit 51 transmits the received management information to the information processing device 100 through the network N (step S9).

The reception control unit 131 in the information processing device 100 receives management information from the base station 50-1 through the communication unit 110 and the network N (step S10). The reception control unit 131 outputs the received management information to the identification unit 132. As the management information is input from the reception control unit 131, the identification unit 132 identifies identification information of the mobile terminal 10 from the received management information based on the sentence transmission format 21 (step S11). The identification unit 132 outputs the received management information and the identified identification information to the transmission control unit 135 associatively with one another.

As management information and identification information associated therewith are input from the identification unit 132, the transmission control unit 135 refers to the management information storage unit 121 and identifies the fishing industry radio association 70 where a fishing vessel with the mobile terminal 10 installed therein belongs thereto, based on the identification information (step S12). The transmission control unit 135 transmits management information to the terminal device 80 of the identified fishing industry radio association 70 through the communication unit 110 and the network N (step S13).

The terminal device 80 receives management information from the information processing device 100 through the network N (step S14). The terminal device 80 accumulates and stores the received management information in a storage unit (step S15). For example, the terminal device 80 plots, and displays on a non-illustrated display unit, positional information of a belonging fishing vessel on a map, so as to provide the positional information to a user for the terminal device 80. Thereby, even in a case where a fishing vessel with the mobile terminal 10 installed therein is unable to be in contact for a long period of time, management information is requested to be transmitted at multiple frequencies and in multiple time zones, and hence, reachability of such a request for the mobile terminal 10 can be improved.

Next, an example of an operation of the information processing device 100 will be described in a case where weather information, market information, and the like are transmitted to the mobile terminal 10 to execute information provision thereto. A basic operation is similar to the transmission of request information as described above, and hence, its description with a sequence diagram will be omitted.

The information provision unit 134 in the information processing device 100 refers to the provided information storage unit 122 and generates information that includes information to identify a blank map and weather information that corresponds to a position on the blank map. The information provision unit 134 refers to the provided information storage unit 122 and generates market information of a marine product for each port or the like. The information provision unit 134 outputs each piece of the generated information to the transmission control unit 135.

As each piece of information is input from the information provision unit 134, the transmission control unit 135 refers to the time table storage unit 123 and transmits each piece of the information to the plurality of base stations 50 through the network N so as to execute its transmission to the mobile terminal 10 in a corresponding transmission time zone and at a corresponding transmission frequency.

The communication unit 51 in the base station 50-1 receives each piece of information from the information processing device 100 through the network N. The communication unit 51 transmits each piece of information to a fishing vessel with the mobile terminal 10 installed therein, according to a time table. That is, for example, for a fishing vessel that is present in a second area, the communication unit 51 transmits each piece of information to a fishing vessel with the mobile terminal 10 installed therein in the second area at a time allotted for information for the second area on a time table.

The control unit 15 in the mobile terminal 10 installed in a fishing vessel receives a radio wave at one of predetermined frequencies through the communication unit 11 at a time allotted for information for a second area on a time table to receive each piece of information. The control unit 15 causes the display operation unit 14 to display each piece of the received information. For information that is displayed on the display operation unit 14, for example, a blank map of the area with weather information plotted thereon or a port with landing scheduled based on market information is displayed. Thereby, weather information or market information in each sea area can be provided to a fishing vessel in a distant sea.

Thus, the information processing system 1 includes the mobile terminal 10, the plurality of base stations 50, and the information processing device 100. The information processing device 100 includes a generation unit that generates information to be transmitted to the mobile terminal 10, and a transmission unit that transmits the generated information to the plurality of base stations 50. The plurality of base stations 50 include communication units that receive information transmitted from the information processing device 100, then generate a radio signal in a shortwave frequency band that corresponds to the information, and transmit the generated radio signal to the mobile terminal 10. The mobile terminal 10 includes a control unit that acquires the information from the radio signal transmitted from one base station 50 among the plurality of base stations 50 in a case where the radio signal is received thereby. As a result, reachability of information for a ship can be improved.

Each base station 50 in the plurality of base stations 50 in the information processing system 1 transmits the information to the mobile terminal 10 on one or more conditions among a set of a predetermined time difference and a common frequency and a set of a different frequency and a common time. As a result, reachability of information for a ship can further be improved.

Each base station 50 in the plurality of base stations 50 in the information processing system 1 is set to be capable of transmitting a radio signal with a common shortwave frequency. As a result, a dead band caused by a skip phenomenon can be reduced.

Each base station 50 in the plurality of base stations 50 in the information processing system 1 includes a plurality of transmitters, and each of the plurality of transmitters is set so as to transmit, in a case where a plurality of common frequencies are set, a radio signal with one frequency among the set plurality of the common shortwave frequencies. As a result, reachability of information for a ship can further be improved.

The mobile terminal 10 in the information processing system 1 is installed in a ship. As a result, information can be provided to a chip.

The information processing device 100 in the information processing system 1 generates, as the information, information including request information that includes identification information of the mobile terminal 10 and a transmission time zone and a transmission frequency to transmit management information that includes the identification information and positional information of the mobile terminal 10, and is to request the mobile terminal 10 to transmit the management information. The information processing device 100 further receives the management information transmitted from one or more of the plurality of base stations 50 that have received the management information transmitted in the transmission time zone being included in the request information and at the transmission frequency being included in the request information from a mobile terminal 10 that has received the request information and includes identification information corresponding to the identification information being included in the request information. As a result, a fishing vessel that is unable to be in contact for a long period of time can be requested to transmit management information and the management information can be received from the fishing vessel.

The information in the information processing system 1 includes information to identify a blank map and weather information that corresponds to a position on the blank map, and the mobile terminal 10 executes control to refer to a storage unit that stores the blank map, identify a blank map based on the information to identify a blank map, and arrange and display graphic information based on the weather information on the identified blank map. As a result, weather information in a sea area with a fishing vessel being present therein can be provided to the fishing vessel.

The information in the information processing system 1 includes market information of a marine product for each port. As a result, what port a fishing vessel lands a caught marine product in can readily be known.

The information processing system 1 includes the plurality of base stations 50 set to be capable of transmitting a radio signal with an identical shortwave frequency by a first network. The information processing system 1 includes the information processing device 100 that transmits information being transmitted from at least one base station 50 among the plurality of base stations 50 by the first network, to the plurality of base stations 50, by a second network different from the first network. As a result, information can be transmitted from one or more of the base stations 50.

Reception information is transmitted from the information processing device 100 to a person involved in a fishing vessel with the mobile terminal 10 installed therein in the embodiment as described above that is not limited thereto. For example, a Web server function may be added to the information processing device 100 so that a map with positional information of each fishing vessel being plotted thereon is displayed on a Web page on the Internet and a person involved in a fishing vessel logs in the Web page to view the Web page. Thereby, a person involved in a fishing vessel views a position of a fishing vessel plotted on a map, and hence, more readily recognize the position of the fishing vessel. Reception information may be transmitted to a person involved in a fishing vessel through a telephone, FAX, or the like.

An antenna that is connected to the communication unit 51 in the base station 50 is connected to each radio in the embodiment as described above that is not limited thereto. For example, a multiband-type antenna may be used or an antenna tuner may be used. Different frequencies may be used between transmission from a ship to land and transmission from land to a ship. Thereby, a condition on an installation site of an antenna is relaxed.

PSK31 is provided as an example of digital modulation in the embodiment as described above that is not limited thereto. For example, a narrowband digital modulation usable in a shortwave band, such as Radioteletype (RTTY), packet communication, or SSTV, may be used. Thereby, communication with a larger amount of data can be executed in a high frequency band in a shortwave band.

An identical content is transmitted at an identical time on a time table in the embodiment as described above that is limited thereto. For example, an order of information to be transmitted may be changed, and a frequency may be dedicated for transmission from the base station 50 while another frequency may be dedicated for transmission from the mobile terminal 10. Thereby, for example, a response to a priority communication request can be received at any time.

Request information is transmitted at timing of transmitting of request information from the information processing device 100 in a case where no regular communication is provided for a long period of time, for example, 48 hours or the like in the embodiment as described above that is not limited thereto. For example, request information may be transmitted in a case where a family of a crew of a fishing vessel desires to be in contact. In such a case, request information may include a content of contact or the like and management information that is transmitted from the mobile terminal 10 of a fishing vessel may include a response to the contact.

Each component of each illustrated unit is not necessarily requested to be physically configured as illustrated in the figures. That is, a specific configuration of dispersion or integration of respective units is not limited to those illustrated in the figures, and can be configured by functionally or physically dispersing or integrating all or a part thereof in an arbitrary unit depending on a variety of loads, usage, or the like. For example, a case where the terminal device 80 is installed in the fishing industry radio association 70 together with the base station 50 is illustrated in the embodiment as described above, and the terminal device 80 may be installed at a location different from that of the base station 50 as long as it is communicable with the information processing device 100.

For a variety of processing functions to be executed in each device, all or any part thereof may be executed on a computer such as a CPU (or an MPU or a Micro Controller Unit (MCU)). For a variety of processing functions, it goes without saying that all or any part thereof may be executed on a program that is analyzed and executed in a CPU (micro-computer such as an MPU or an MCU) or on hardware based on wired logic.

Figure 6:
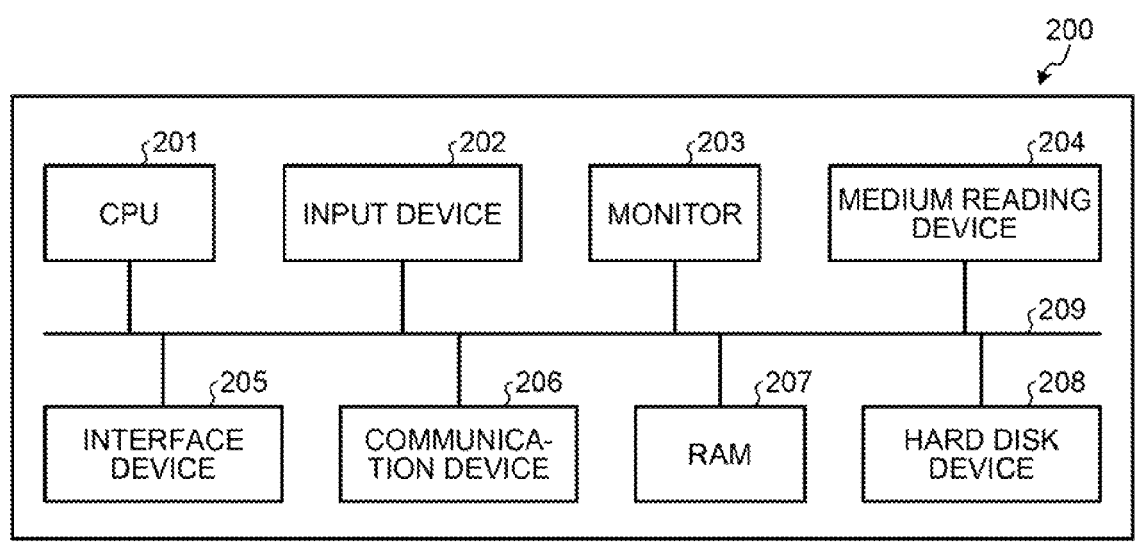
FIG. 6 is an illustration diagram illustrating an example of a computer that executes an information processing program.

A variety of processes described in the embodiment as described above can be realized by executing a preliminarily prepared program on a computer. Hereinafter, an example of a computer that executes a program that has a function similar to that of the embodiment as described above will be described. FIG. 6 is an illustration diagram illustrating an example of a computer that executes an information processing program.

As illustrate in FIG. 6, a computer 200 includes a CPU 201 that executes a variety of operation processes, an input device 202 that receives a data input, and a monitor 203. The computer 200 includes a medium reading device 204 that reads a program or the like from a storage medium, an interface device 205 to connect with a variety of devices, and a communication device 206 to provide wired or wireless connection with another information processing device or the like. The computer 200 includes a RAM 207 that temporarily stores a variety of information, and a hard disk device 208. Each of the devices 201 to 208 is connected to a bus 209.

In the hard disk device 208, an information processing program is stored that includes functions similar to those of respective processing units as illustrated in FIG. 1 that are the reception control unit 131, the identification unit 132, the request unit 133, the information provision unit 134, and the transmission control unit 135. In the hard disk device 208, a variety of data are stored to realize the management information storage unit 121, the provided information storage unit 122, the time table storage unit 123, and an information processing program. The input device 202 receives, for example, an input of a variety of information such as operation information, from an administrator for the computer 200. The monitor 203 displays, for example, a variety of screens to an administrator for the computer 200. For example, a printing device or the like is connected to the interface device 205. For example, the communication device 206 includes a function similar to that of the communication unit 110 as illustrated in FIG. 1, is connected to the network N, and communicates a variety of information such as management information with the base station 50.

The CPU 201 reads out, develops on the RAM 207, and executes, each program stored in the hard disk device 208, to execute a variety of processes. These programs can cause the computer 200 to function as the reception control unit 131, the identification unit 132, the request unit 133, the information provision unit 134, and the transmission control unit 135 as illustrated in FIG. 1.

The information processing program as described above is not necessarily requested to be stored in the hard disk device 208. For example, a program stored in a storage medium readable by the computer 200 may be read out and executed by the computer 200. A storage medium readable by the computer 200 corresponds to, for example, a CD-ROM, a DVD disc, a portable recording medium such as a Universal Serial Bus (USB) memory, a semiconductor memory such as a flash memory, a hard disk drive, or the like. Such an information processing program may be stored in a device connected to a public line, the Internet, a LAN, or the like, and the computer 200 may read out therefrom, and execute, the information processing program.

Reachability of information for a ship can be improved.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing system comprising a mobile terminal, a plurality of base stations, and an information processing device, wherein:
   the information processing device includes
   a first processor that executes a first process including
   first generating information to be transmitted to the mobile terminal, and
   first transmitting the generated information to the plurality of base station;
   the plurality of base stations include a second processor that executes a second process including receiving the information transmitted from the information processing device, then second generating a radio signal in a shortwave frequency band that corresponds to the information, and second transmitting the generated radio signal to the mobile terminal; and
   the mobile terminal includes a third processor that executes a third process including acquiring the information from the radio signal transmitted from one base station among the plurality of base stations in a case where the radio signal is received, wherein
   the first generating includes generating, as the information, information including request information that includes identification information of the mobile terminal and a transmission time zone and a transmission frequency to transmit management information that includes the identification information and positional information of the mobile terminal, and is to request the mobile terminal to transmit the management information, and receiving the management information transmitted from one or more of the plurality of base stations that have received the management information transmitted in the transmission time zone included in the request information and at the transmission frequency included in the request information from a mobile terminal that has received the request information and includes identification information corresponding to the identification information included in the request information.

2. The information processing system according to claim 1, wherein each base station in the plurality of base stations transmits the information to the mobile terminal on one or more conditions among a set of a predetermined time difference and a common frequency and a set of a different frequency and a common time.

3. The information processing system according to claim 1, wherein each base station in the plurality of base stations is set to be capable of transmitting a radio signal with a set of a different frequency and a common time.

4. The information processing system according to claim 1, wherein each base station in the plurality of base stations includes a plurality of transmitters, and each of the plurality of transmitters is set to transmit, in a case where a plurality of common frequencies are set, a radio signal with one frequency among the set plurality of the common shortwave frequencies.

5. The information processing system according to claim 1, wherein the mobile terminal is installed in a ship.

6. The information processing system according to claim 1, wherein the information includes information to identify a blank map and weather information that corresponds to a position on the blank map, and
   the mobile terminal executes control to refer to a storage that stores the blank map, identify a blank map based on the information to identify a blank map, and arrange and display graphic information based on the weather information on the identified blank map.

7. The information processing system according to claim 1, wherein the information includes market information of a marine product for each port.

8. An information processing method comprising:
   generating information to be transmitted to a mobile terminal and first transmitting the generated information to a plurality of base station, by an information processing device;
   receiving the information transmitted from the information processing device, and then, generating, and second transmitting to the mobile terminal, a radio signal in a shortwave frequency band that corresponds to the information, by the plurality of base stations; and
   executing control to acquire the information from the radio signal transmitted from one base station among the plurality of base stations in a case where the radio signal is received, by the mobile terminal, wherein
   the generating includes generating, as the information, information including request information that includes identification information of the mobile terminal and a transmission time zone and a transmission frequency to transmit management information that includes the identification information and positional information of the mobile terminal, and is to request the mobile terminal to transmit the management information, and receiving the management information transmitted from one or more of the plurality of base stations that have received the management information transmitted in the transmission time zone included in the request information and at the transmission frequency included in the request information from a mobile terminal that has received the request information and includes identification information corresponding to the identification information included in the request information.

9. An information processing system comprising:
   a plurality of base stations configured to transmit a radio signal with a set of a different frequency and a common time by a first network; and
   an information processing device configured to transmit information transmitted from one or more base stations among the plurality of base stations by the first network, to the plurality of base stations, by a second network different from the first network, and
   generate, as the information, information including request information that includes identification information of a mobile terminal and a transmission time zone and a transmission frequency to transmit management information that includes the identification information and positional information of the mobile terminal, and is to request the mobile terminal to transmit the management information, and receive the management information transmitted from one or more of the plurality of base stations that have received the management information transmitted in the transmission time zone included in the request information and at the transmission frequency included in the request information from a mobile terminal that has received the request information and includes identification information corresponding to the identification information included in the request information.

* * * * *